United States Patent
Noaeill

(10) Patent No.: US 10,925,258 B1
(45) Date of Patent: Feb. 23, 2021

(54) BONE HOLDING DEVICE FOR AN ANIMAL

(71) Applicant: Joni S. Noaeill, Dodge Center, MN (US)

(72) Inventor: Joni S. Noaeill, Dodge Center, MN (US)

(*) Notice: Subject to any disclaimer, the term of this patent is extended or adjusted under 35 U.S.C. 154(b) by 0 days.

(21) Appl. No.: 16/027,039

(22) Filed: Jul. 3, 2018

(51) Int. Cl.
   *A01K 15/02* (2006.01)
   *A01K 5/01* (2006.01)

(52) U.S. Cl.
   CPC .......... *A01K 15/026* (2013.01); *A01K 5/0114* (2013.01)

(58) Field of Classification Search
   CPC ... A01K 15/026; A01K 15/025; A01K 5/0114
   See application file for complete search history.

(56) References Cited

U.S. PATENT DOCUMENTS

| | | | |
|---|---|---|---|
| 2,726,838 A * | 12/1955 | Ripley, Jr. | A47G 19/10 248/105 |
| 5,148,769 A | 9/1992 | Zelinger | |
| 6,076,486 A * | 6/2000 | Oliano | A01K 15/026 119/709 |
| 8,087,387 B2 * | 1/2012 | Gamble | A01K 15/026 119/707 |
| 8,544,412 B1 * | 10/2013 | Haverstock | A01K 5/0135 119/61.5 |
| 9,848,585 B1 | 12/2017 | Perozo et al. | |
| 2003/0172879 A1 | 9/2003 | Bader | |
| 2003/0205206 A1 | 11/2003 | Natale et al. | |
| 2008/0314331 A1 * | 12/2008 | DeGhionno | A01K 5/0114 119/709 |
| 2013/0255592 A1 | 10/2013 | Foley | |
| 2018/0055013 A1 * | 3/2018 | Daley | A01K 15/026 |

OTHER PUBLICATIONS

Bone Mat Dog Bone Holder. Product listing [online]. © 1996-2018, Amazon.com, Inc. or its affiliates [retrieved on Jan. 31, 2018]. Retrieved from the Internet: <URL: >https://www.amazon.com/Bone-Mat-Dog-Holder/dp/B00FYNJ64Y.

* cited by examiner

*Primary Examiner* — Son T Nguyen
(74) *Attorney, Agent, or Firm* — Cramer Patent & Design, PLLC; Aaron R. Cramer

(57) ABSTRACT

A bone holding device for an animal comprises an apparatus designed to removably secure a chewable comestible such as a bone between to support posts having two (2) support bases. The securement apparatus is size adjustable and secured between the two (2) support posts by a metallic bar.

1 Claim, 5 Drawing Sheets

BONE HOLDING DEVICE FOR AN ANIMAL

RELATED APPLICATIONS

None.

FIELD OF THE INVENTION

The present invention relates generally to the field of a bone holding device for an animal.

BACKGROUND OF THE INVENTION

There is perhaps no better picture of satisfaction than that of a dog chewing on a bone. It is sure to bring a smile to the face of any dog owner watching the dog, as it has since the beginning of time when man and dog began their infamous friendship. In a typical pose, the dog has their front legs and paws crossed around the bone holding it in place while chewing on it with their mouth.

While in most cases, such a position works very well. However, older dogs, or dogs with injuries or disabled front legs may be unable to obtain such a position or hold it for long periods of time. Accordingly, there exists a need for a means by which dogs can more easily hold a bone while chewing on it. The development of the treat holding device for canines fulfills this need.

To achieve the above and other objectives, the present invention provides for an a treat holding device, comprising of a central spherical body, a pair of support arms emanating from the central spherical body at either side, each of the pair of support arms having a distal end, a holding pad disposed on each distal end of the pair of support arms, a central slot provided in an upper portion of the central spherical body and extends at a topmost point portion of the central spherical body and a restraint provided within the central slot. A treat is held in position via friction fit within the restraint.

The treat holding device may restrains the treat while the treat is being chewed upon by an animal and may also serves as an animal toy. When used as a toy, the treat holding device is thrown by holding one of the holding pads and whipping the treat holding device outward using the central spherical body as a weight.

The treat holding device may be water-resistant and may comprises dishwasher-safe material. The treat holding device may be in a size range of 6 to 8 inches in width or 14 to 16 inches in width. The central spherical body may be in a size range of 2 to 3 inches in diameter. Each of the pair of support arms may be in a range of 2 to 3 inches long. The central spherical body, the pair of support arms and the holding pads may be made of durable nylon or fiberglass material that withstand chewing by the animal without damage.

The central spherical body, the pair of support arms and the holding pads may have a linear arrangement that matches the in-line arrangement of a body alignment of the animal when the animal is in a lying position. When a mouth area of the animal is in general alignment with a front paw of the animal, the front paw generates a holding force upon the holding pad allowing the central spherical body to remain stationary near the mouth area of the animal.

An upper surface of each holding pad may be provided with multiple friction aids that are selected from a group consisting of holes, abrasive pads, or embossed protrusions. The upper surface of each holding pad may be in a range of 10 to 12 inches in length.

An animal treat may be inserted into the central slot of the central spherical body which may be ¾ inches wide. The restraint may comprise a durable waterproof dense foam with a plasticized coating while the plasticized coating may comprise vinyl.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
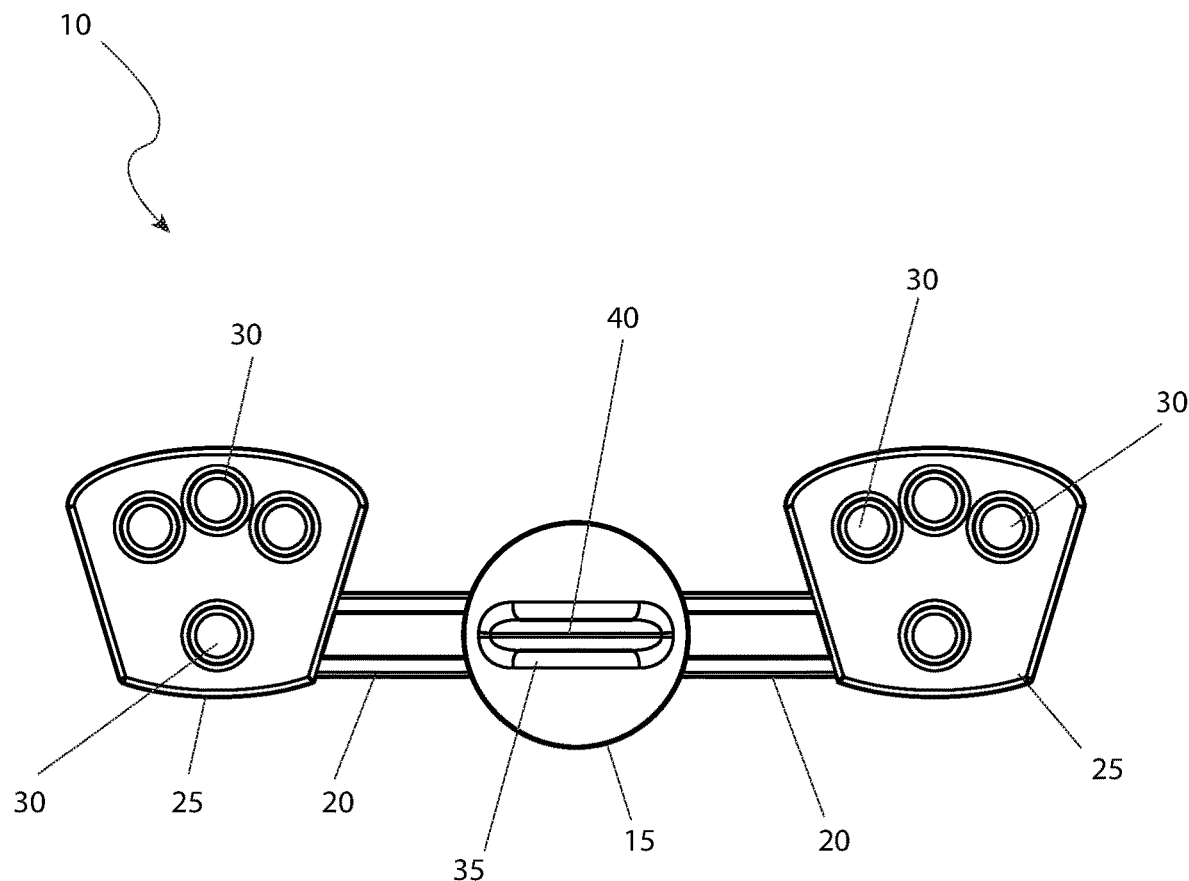
FIG. 1 is a top view of the treat holding device 10, according to the preferred embodiment of the present invention.

DESCRIPTIVE KEY 10 treat holding device
15 central spherical body
20 support arm
25 holding pad
30 friction aid
35 central slot
40 semi-pliable restraint
45 holding force "h"
50 dog treat
55 dog
60 front paw
65 head
70 floor grade
75 mouth area

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the treat holding device 10, according to the preferred embodiment of the present invention is disclosed. The treat holding device 10 (herein also described as the "device") 10, includes a central spherical body 15 envisioned to be approximately two to three inches (2-3 in.) in diameter. Emanating from the central spherical body 15 at either side at a one hundred eighty degree (180°) orientation are two (2) support arms 20, each approximately two to three inches (2-3 in.) long. At the distal end of each support arm 20 is a holding pads 25 (total two (2) each). It is envisioned that the central spherical body 15, the support arms 20, and the holding pads 25 would be manufactured of a durable material such as nylon or fiberglass that would withstand chewing and other abuse by a pet without damage. The upper surface of each holding pad 25 is provided with multiple friction aids 30, such as, but not limited to: holes, abrasive pads, embossed protrusions or the like. It is noted that the dimensions listed above are for a typical or medium sized version of the device 10 for a medium sized dog. As such the overall length for a medium sized version would be approximately the to twelve inches (10-12 in.) in overall length. Other versions of the device 10 for both smaller and larger dogs would be made available with the total overall length for a smaller dog approximately six to eight inches (6-8 in.) and the total overall length for a larger dog approximately fourteen to sixteen inches (14-16 in.). All other noted dimensions above would be correspondingly adjusted to maintain the same overall perspective. A central slot 35 is provided in the upper portion of the central spherical body 15 and extends approximately one hundred-sixty degrees (160°), centered at the topmost point and is approximately three-quarters of an inch (¾ in.) wide. A semi-pliable restraint 40 is provided within the central slot 35 and will be described in greater detail herein below.

Figure 2:
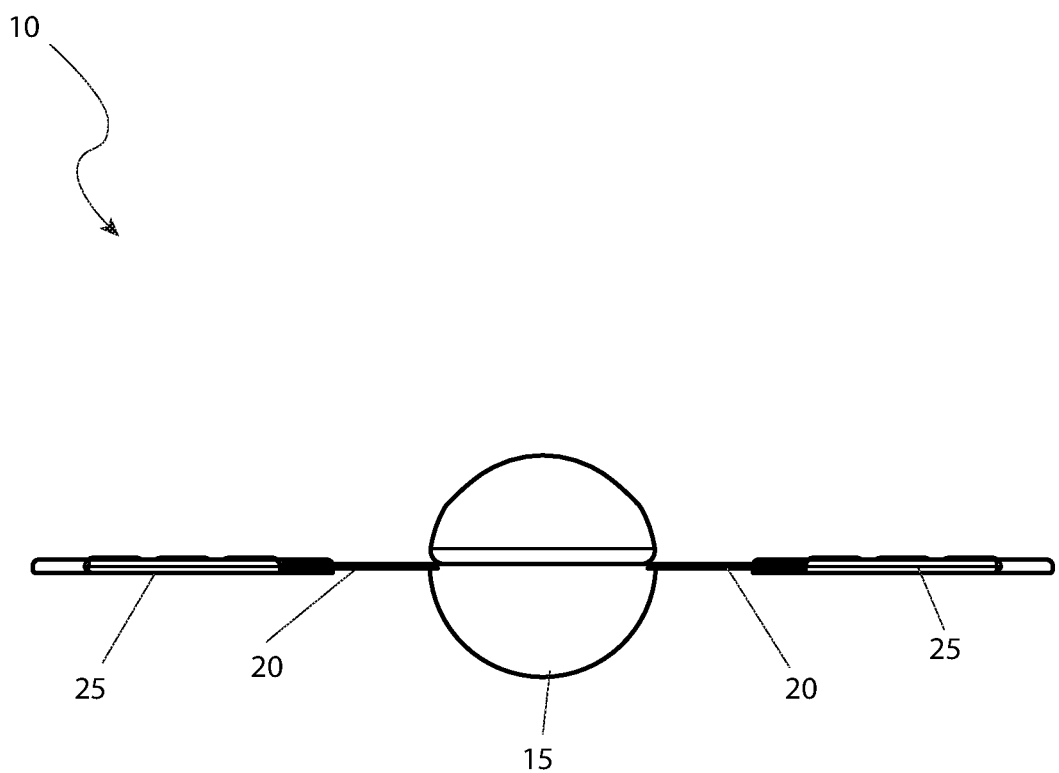
FIG. 2 is a side view of the treat holding device 10, according to the preferred embodiment of the present invention.

Referring next to FIG. 2, a side view of the device 10, according to the preferred embodiment of the present invention is depicted. This view provides additional clarification on the configuration of the central spherical body 15 and its relationship with the two (2) support arms 20 and the two (2) holding pads 25. While the intended purpose of the device 10 is to aid in the holding of a bone or treat while being chewed upon by a dog, it is envisioned that the present invention could also serve as a toy in and of itself. It would ideally be used as a fetch toy in that it could be easily thrown by holding one (1) of the holding pads 25 and "whipping" it outward using the central spherical body 15 as a weight. Likewise, the support arms 20 serve as excellent surfaces that the dog 55 could bite upon to carry back. The durable construction of the central spherical body 15, the support arms 20, and the holding pads 25 ensure a long life with little to no chewing damage over time.

Figure 3:
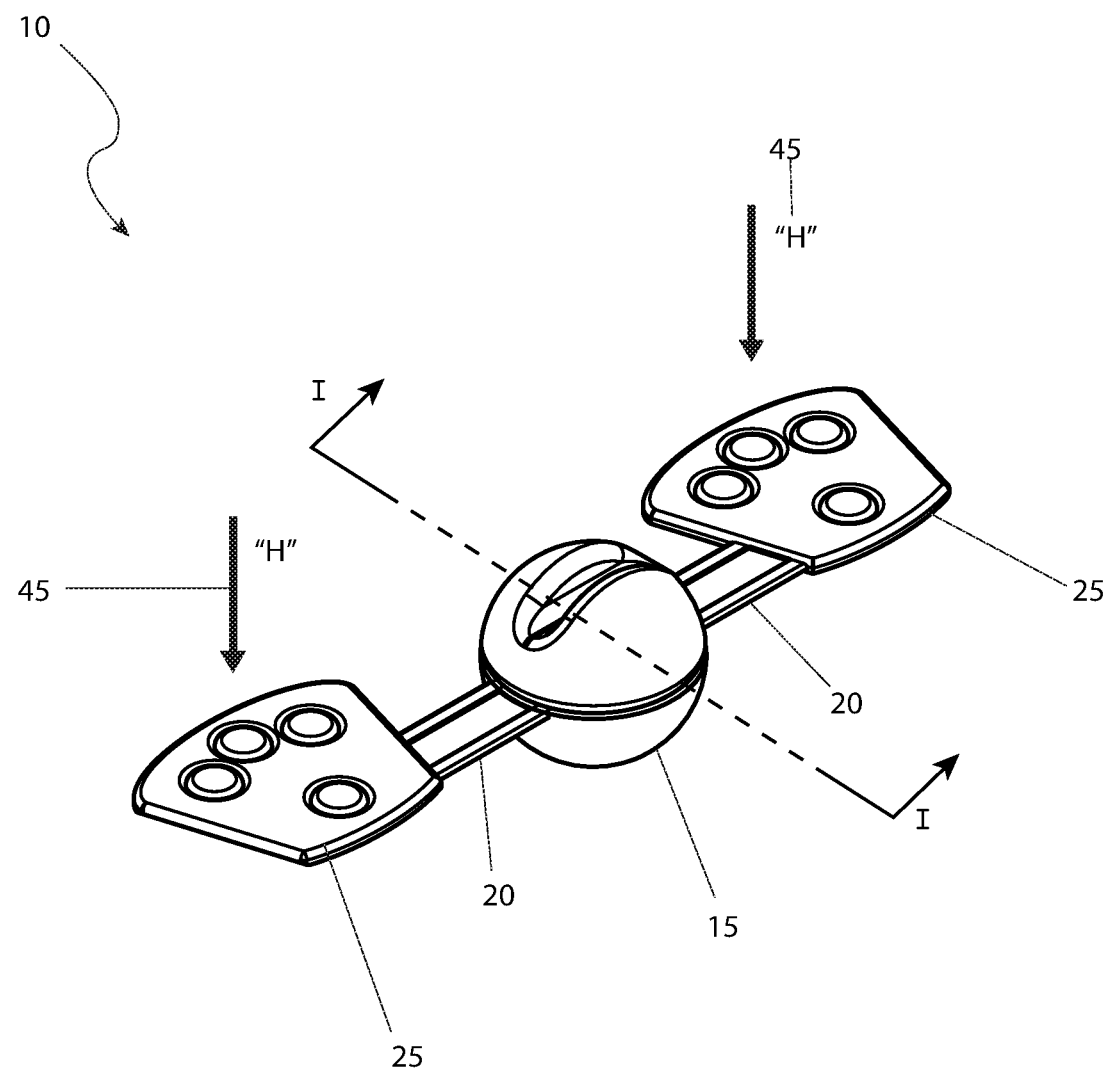
FIG. 3 is a perspective view of the treat holding device 10 according to the preferred embodiment of the present invention.

Referring now to FIG. 3, a perspective view of the device 10, according to the preferred embodiment of the present invention is shown. This view provides a clear indication of the linear arrangement of the holding pads 25 and the support arms 20 with the central spherical body 15. Such a lineup matches the in-line arrangement as found in the body alignment of a dog 55 when in a lying position. As such, the dog's mouth area 75 is in general alignment with the dog's front paw area 60. As such the dog's paw 60 generates a holding force "h" 45 upon the holding pad(s) 25 allowing the central spherical body 15 to remain stationary near the dog's mouth 75. Further detail of said arrangement will be provided herein below.

Figure 4:
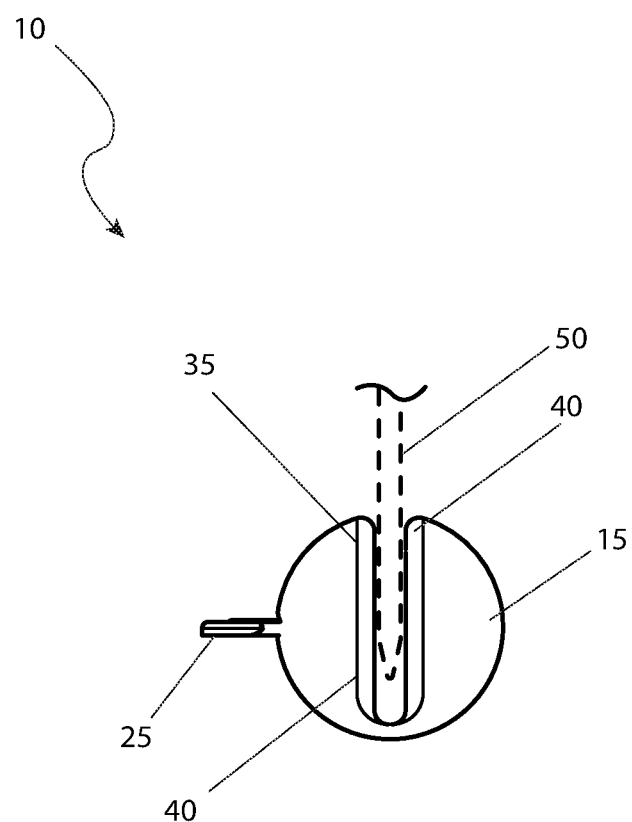
FIG. 4 is a sectional view of the treat holding device 10, as seen along a line I-I, as shown in FIG. 3, according to the preferred embodiment of the present invention; and, FIG. 5 is a perspective view of the treat holding device 10, shown in a utilized state, according to the preferred embodiment of the present invention.

Referring next to FIG. 4, a sectional view of the device 10, as seen along a line I-I, as shown in FIG. 3, according to the preferred embodiment of the present invention is disclosed. This view discloses a dog treat 50 inserted into the central slot 35 of the central spherical body 15. The dog treat 50 is envisioned to be a bone, a rawhide strip, a dental cleaning treat or any similar object. The use of any particular type of dog treat 50 is not intended to be a limiting factor of the present invention. The dog treat 50 is held in position via friction fit with the semi-pliable restraint 40. The semi-pliable restraint 40 is envisioned to be a durable waterproof dense foam with a plasticized coating such as vinyl. As such, the force necessary to place the dog treat 50 is easy to perform by a human user but would be relatively difficult to remove for a canine. All components of the device 10 are envisioned to be easily cleaned with soap and water and may even be placed in a dishwasher. Finally, it is noted that the far holding pads 25 is visible in this FIGURE as well, once again displaying the central linear arrangement as aforementioned described.

Figure 5:
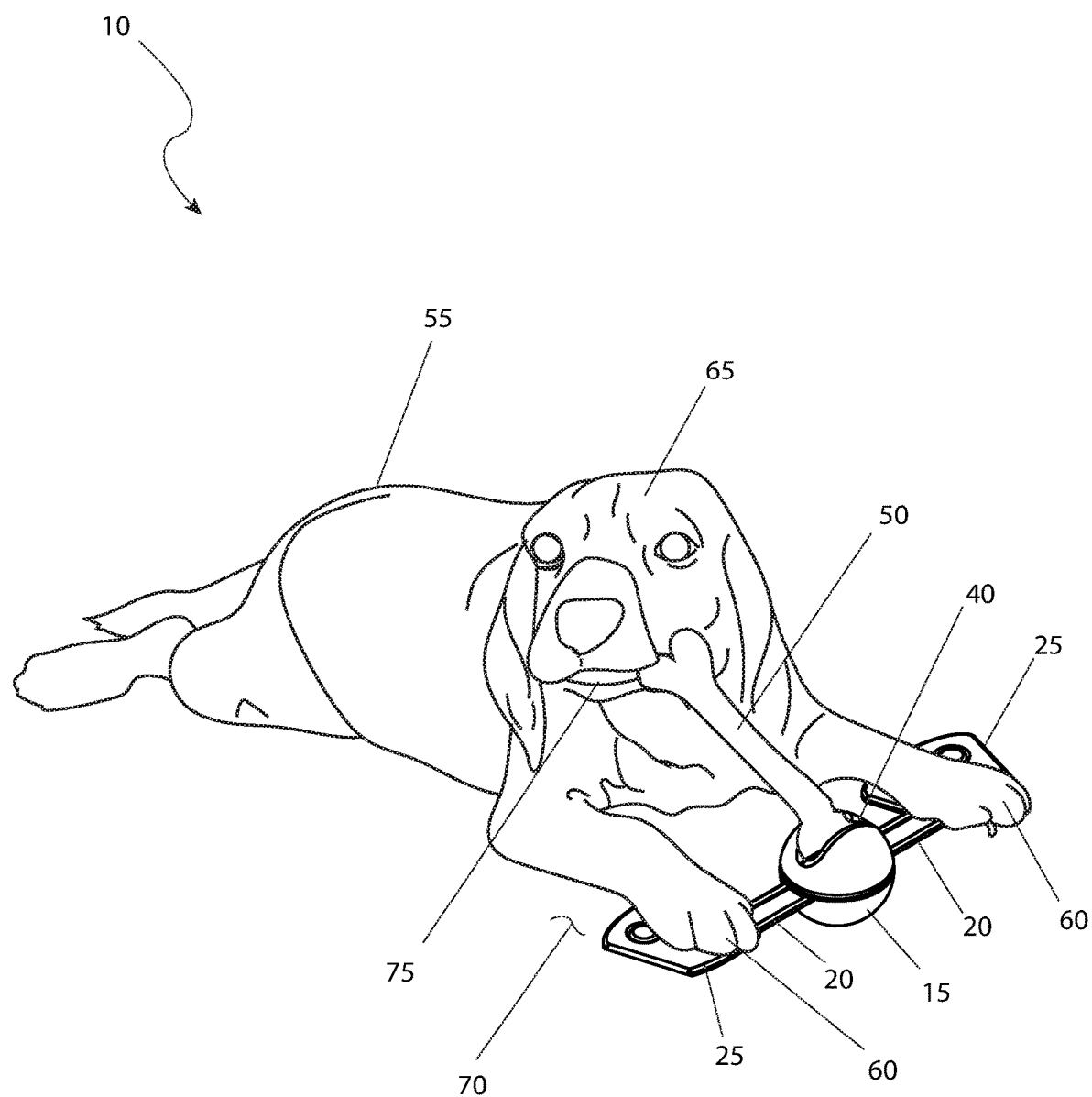

Referring finally to FIG. 5, a perspective view of the device 10, shown in a utilized state, according to the preferred embodiment of the present invention is depicted. A dog 55 positions the device 10 such that each front paw 60 holds down a holding pad 25 respectively. The central spherical body 15, thus centrally positioned by the support arms 20, holds a dog treat 50, herein depicted as a bone for illustrative purposes, within the semi-pliable restraint 40. This positioning, depending on the elevation of the head 65 of the dog 55 above floor grade 70 allows the dog 55 to chew or gnaw upon the dog treat 50 with their teeth/mouth 75. The elevation of the head 65 of the dog 55 will thus be dependent on the overall length/size of the dog treat 50. As such, the features of the device 10 allow the dog 55 to chew upon the dog treat 50 while their front paws 60 remain in a natural position. Additionally, in the case of elderly or disabled dog 55, the consumption of a dog treat 50 may occur without the necessity of an owner or care provider holding it in place for the dog 55 to chew. Such attributes provide for the overall improvement of quality of life for the dog 55.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 paying particular regard to the overall size of the device 10 to match the size of the dog 55. As aforementioned described, the device 10 is envisioned to be provided in small, medium, and large sizes to account for all sizes of dog 55.

After procurement and prior to utilization, the device 10 would be prepared in the following manner: the dog treat 50 would be inserted in the central slot 35 of the central spherical body 15 where it is held in place by the semi-pliable restraint 40; the device 10 with the dog treat 50 inside is then given to the dog 55; initial training for the dog 55 with regard to the placement of their front paws 60 on the holding pad 25 may be necessary.

During utilization of the device 10, the following procedure would be initiated: the dog 55 chews upon the dog treat 50 as held by the device 10 as depicted in FIG. 5; chewing continues until either the dog treat 50 is consumed, or the dog 55 tires of the activity.

After use of the device 10, any remaining dog treat 50 within the dog treat 50 is removed; the device 10 may then be cleaned or simply stored until needed again to hold a future dog treat 50 in a circular and repeating manner.

These features make the consumption of dog treat 50 more enjoyable for the dog 55 and eliminates having the dog 55 attempt to awkwardly hold the dog treat 50 directly with their front paws 60. It is ideal for use by older dog 55 or dog 55 with injured or disabled front paws 60. In addition to enhancing the quality of life for the dog 55, the device 10 is envisioned to bring increased satisfaction to pet owners as well.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A treat holding device, consisting of:
   a central spherical body;
   a pair of support arms emanating from said central spherical body at either side, each of said pair of support arms having a distal end;
   a holding pad disposed on each said distal end of said pair of support arms;
   a central slot provided in an upper portion of said central spherical body and extends at a topmost point portion of said central spherical body; and
   a restraint provided within said central slot;
   wherein a treat is held in position via friction fit within said restraint;
   wherein said treat holding device is water-resistant;
   wherein an upper surface of said each holding pad is provided with multiple friction aids that are embossed protrusions;
   wherein said central spherical body, said pair of support arms, and said holding pads are made of durable nylon material that withstand chewing by said animal without damage to said animal;
   wherein said central spherical body, said pair of support arms, and said holding pads are made of fiberglass material that withstand chewing by said animal without damage to said animal;
   wherein said restraint is made of a durable waterproof dense foam with a plasticized coating, the dog treat is held in position via friction fit with the restraint force necessary to place the dog treat within the restraint;
   wherein said central spherical body, said pair of support arms, and said holding pads have a linear arrangement that matches an inline arrangement of a body alignment of said animal when said animal is in a lying position;
   wherein said treat holding device restrains said treat while said treat is chewed upon by an animal;
   wherein said treat holding device serves as an animal toy;
   wherein said treat holding device is made of dishwasher-safe material;
   wherein said animal treat is inserted into said central slot of said central spherical body;
   wherein said plasticized coating is made of vinyl; and
   wherein said treat holding device is in a range of 6 inches to 8 inches in width or 14 inches to 16 inches in width.

* * * * *